UNITED STATES PATENT OFFICE.

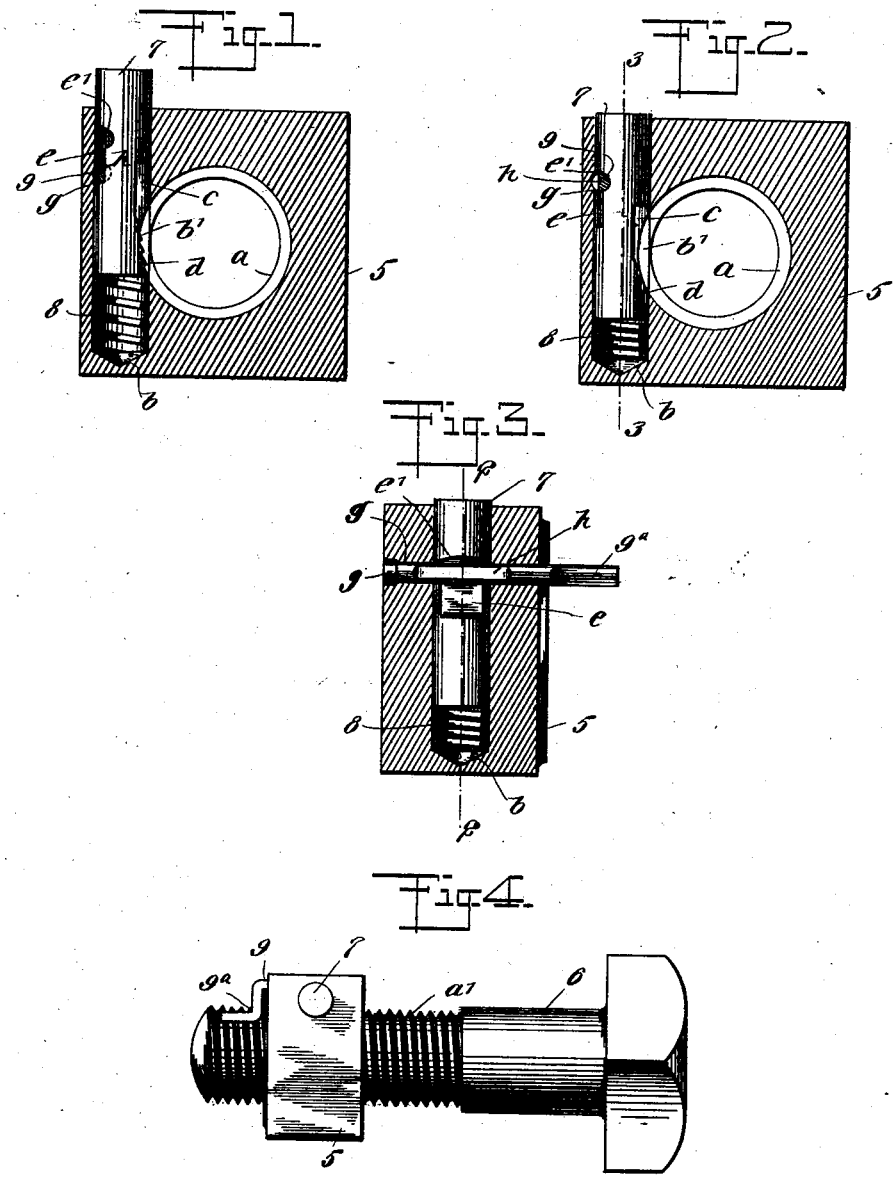

ALEXANDER TAYLOR WILSON, OF CHICAGO, ILLINOIS.

NUT-LOCK.

SPECIFICATION forming part of Letters Patent No. 696,290, dated March 25, 1902.

Application filed August 15, 1901. Serial No. 72,145. (No model.)

*To all whom it may concern:*

Be it known that I, ALEXANDER TAYLOR WILSON, a citizen of the United States, and a resident of Chicago, in the county of Cook and State of Illinois, have invented a new and Improved Nut-Lock, of which the following is a full, clear, and exact description.

This invention has for its object to provide a novel simple nut-lock adapted for convenient adjustment to lock the nut on the thread of an engaged bolt and also to release the nut from the bolt without detriment to either the nut or bolt.

The invention consists in the novel construction and combination of parts, as hereinafter described, and defined in the appended claims.

Reference is to be had to the accompanying drawings, forming a part of this specification, in which similar characters of reference indicate corresponding parts in all the figures.

Figure 1 is a sectional side view of a nut having the improvement, showing parts adjusted for locking the nut on a bolt-thread. Fig. 2 is a similar view showing the locking device released from the bolt-thread, the view being taken on the line 2 2 in Fig. 3. Fig. 3 is a transverse sectional view on the line 3 3 in Fig. 2 showing the locking device in releasing adjustment, and Fig. 4 is a side view of a bolt and nut and an exterior view of features of the improvement on the nut.

The improvement may be utilized for locking nuts of hexagonal form, if desired, but is better adapted to lock a square nut on a threaded bolt, and is so represented in the drawings.

The nut 5, as usual, has a central threaded aperture $a$ for screwed engagement with a bolt 6. At one side of the aperture $a$ and in a plane parallel with one side wall of the nut a cylindric bore $b$ is formed in the body of the nut and extends nearly through the same. The bore $b$ cuts through the threaded wall of the aperture $a$, as shown at $b'$ in Figs. 1 and 2, and in said bore the cylindrical-bodied locking-dog 7, preferably constructed of tempered steel, is slidably introduced. A coiled spring 8 is seated in the bore $b$ and on it rests the dog 7, which is normally projected exterior of the nut. A recess $c$ of a suitable length is formed across the body of the dog 7, and at the bottom of this recess an incline is formed from the lower end of the dog, said incline having teeth $d$, formed transversely thereof and hooking toward the lower end of the recess.

It will be seen from the relative position of the cylindrical dog 7 and the teeth $d$ thereon that the teeth are adapted to contact with the threads $a'$ of the bolt 6 and lock the nut from rotation when the dog is at normal elevation, as shown in Fig. 1.

At the side of the cylindrical dog 7 opposite the recess $c$ a portion of the body thereof is removed, so as to produce a flat surface and form an elongated vertical cavity $e$, said cavity being complete when the dog-body is in place within the bore $b$, as shown in Figs. 1 and 2, and at the upper end of the flattened surface a transverse groove $e'$ is formed. A transverse perforation $g$ is formed in the body of the nut 5 at a point which will intersect the lower end of the cavity $e$ when the dog 7 is elevated by the spring 8, and, as shown, the diameter of said perforation is somewhat greater than the width of the cavity, considered from the flattened side of the dog to the opposite side of the bore $b$.

A detent-shaft 9 is provided, consisting of a cylindrical body fitting loosely in the transverse perforation $g$ and having on one end a crank-arm $9^a$, which should be located at the outer end wall of the nut. At a point which corresponds with the flattened surface of the dog-body 7 a flat side $h$ is formed on the detent-shaft 9, which reduces the diameter of said shaft at that point and facilitates the introduction of the shaft-body where reduced into the cavity $e$. The crank-arm $9^a$ is so disposed with regard to the flattened side $h$ on the shaft 9 as to permit its free rocking movement without contact with the end of the bolt-body 6 when the nut is screwed on the bolt, the crank-arm being projected toward the longitudinal axis of the bolt 6 when the flattened portion of the shaft 9 occupies the recess $e$, and the teeth $d$ of the dog 7 have contact with the thread on the bolt.

It will be evident that in order to be able to freely screw the nut 5 on the bolt 6 the teeth $d$ should be prevented from pressing upon the crown of the thread $a'$ on the bolt 6. To effect this, it is only necessary to press the dog 7 down in the bore $b$, so as to locate the lateral groove $e'$ opposite the shaft 9, and then rock the crank-arm $9^a$, so as to cause the rounded portion of the shaft opposite from the flat side $h$ to enter the groove $e'$, which will lock the dog in depressed adjustment against the stress of the compressed spring 8, and this will obviously remove the teeth $d$ from the thread $a'$ and permit the nut 5 to be screwed freely upon the bolt 6.

It will be seen that the improved nut-lock is very convenient to operate, for, assuming that the dog 7 has been depressed so as to compress the spring 8 and that the shaft-body 9 has been rocked into the groove $e'$, which will hold said dog depressed, the nut may be screwed upon or removed from a bolt-thread freely; but when it is to be locked this may be instantly effected by a partial rotation of the detent-shaft, so as to cause the flat side $h$ thereon to be disposed opposite the groove $e'$, which will release the dog, so that the spring 8 may press it outward and impinge the teeth $d$ upon the thread of the bolt 6, as before explained. Hence the locking of the nut is effected simply by partly rotating the crank-arm $9^a$ in a proper direction.

The invention is adapted for application to bolts and nuts on machinery or upon fish-plate bolts on railroads and will operate efficiently wherever employed.

Having thus described my invention, I claim as new and desire to secure by Letters Patent—

1. A nut-lock, comprising a nut having a bore at one side of the threaded aperture therein, a spring in the bottom of said bore, a locking-dog seated upon the spring and having teeth at one side adapted to engage with the thread of the bolt whereon the nut is screwed, a crank-arm, and a detent-shaft operative by rocking said arm and engaging a transverse groove in said dog, to hold said dog depressed for release of the teeth thereon from engagement with the thread of the bolt.

2. A nut-lock, comprising a nut having a bore parallel with and near one side thereof, the bore intersecting the threaded aperture in the nut, a coiled spring in the bottom of the bore, a cylindrical locking-dog having an open recess on one side formed by flattening the dog-body, a series of downwardly-hooking teeth on a slope at the lower end of the flattened side of the dog, a flattened side on the opposite surface of the dog-body, having a transverse groove at its upper end and forming an elongated cavity, a detent-shaft rockable in the nut across the cavity, and flattened to reciprocate therein, and a crank-arm on one end of the detent-shaft, which by manipulation will hold the dog depressed by location of the rounded part of the shaft-body opposite the flat side thereon in the transverse groove, and thus prevent the teeth of the dog from engaging the thread of a bolt whereon the nut is screwed.

In testimony whereof I have signed my name to this specification in the presence of two subscribing witnesses.

ALEXANDER TAYLOR WILSON.

Witnesses:
F. E. McNULTY,
A. A. HEANING.